(12) United States Patent  (10) Patent No.: US 7,383,248 B2
Chen  (45) Date of Patent: Jun. 3, 2008

(54) HYPERLINK PARK AND SEARCH

(76) Inventor: Jay Chieh Chen, 1355 Blackstone Rd., San Marino, CA (US) 91108

( * ) Notice: Subject to any disclaimer, the term of this patent is extended or adjusted under 35 U.S.C. 154(b) by 342 days.

(21) Appl. No.: 10/248,042

(22) Filed: Dec. 12, 2002

(65) Prior Publication Data

US 2005/0102274 A1    May 12, 2005

(51) Int. Cl.
  *G06F 17/30*    (2006.01)
(52) U.S. Cl. .................. 707/3; 715/513; 715/501.1
(58) Field of Classification Search ............... 707/1–10
  See application file for complete search history.

(56) References Cited

U.S. PATENT DOCUMENTS

| | | | | | |
|---|---|---|---|---|---|
| 5,140,644 | A | * | 8/1992 | Kawaguchi et al. | 382/226 |
| 5,973,692 | A | * | 10/1999 | Knowlton et al. | 715/835 |
| 5,996,011 | A | | 11/1999 | Humes | 709/225 |
| 6,047,299 | A | * | 4/2000 | Kaijima | 715/532 |
| 6,052,716 | A | * | 4/2000 | Gibson | 709/217 |
| 6,163,779 | A | * | 12/2000 | Mantha et al. | 707/100 |
| 6,266,664 | B1 | | 7/2001 | Russell-Falla et al. | 707/5 |
| 6,389,467 | B1 | * | 5/2002 | Eyal | 709/223 |
| 6,389,472 | B1 | | 5/2002 | Hughes et al. | 709/229 |
| 6,546,388 | B1 | * | 4/2003 | Edlund et al. | 707/5 |
| 6,862,713 | B1 | * | 3/2005 | Kraft et al. | 715/728 |
| 6,941,300 | B2 | * | 9/2005 | Jensen-Grey | 707/4 |
| 6,961,731 | B2 | * | 11/2005 | Holbrook | 707/102 |
| 6,990,494 | B2 | * | 1/2006 | Bates et al. | 707/10 |
| 7,003,506 | B1 | * | 2/2006 | Fisk et al. | 707/1 |
| 2004/0205514 | A1 | * | 10/2004 | Sommerer et al. | 715/501.1 |

\* cited by examiner

*Primary Examiner*—Don Wong
*Assistant Examiner*—Hanh B Thai
(74) *Attorney, Agent, or Firm*—Rothwell, Figg, Ernst & Manbeck

(57) ABSTRACT

The present invention provides a method for hyperlink parking and searching. A user pre-defined search criteria is formed by adding, deleting, or modifying a search criteria that includes at least one search term. A universal resource Locator (URL) is obtained by parking a cursor on a hyperlink displayed on the current viewing computer screen, and, in response to parking the cursor on the hyperlink, an Internet connection with the URL is established. If the parked-on hyperlink is linkable and displayable, then a second indication is displayed on the current viewing computer screen, a web page associated with the URL is imported and searched with the user pre-defined search criteria to determine a number of matches for each search term, and each search term and a number of matches for each search term is displayed on the current viewing computer screen. Otherwise, a first indication is displayed on the current viewing computer screen.

25 Claims, 17 Drawing Sheets

HYPERLINK PARK AND SEARCH

BACKGROUND OF INVENTION

The field of this invention is hyperlink park and search (HPS). More specifically, when the cursor parks on a hyperlink, behind the scene the computer automatically visits the link and performs a range of desired operations, such as:

Searches for a set of strings that the user has inputted and displays on the current viewing screen whether or not there are matches. Stores all displayed data in the computer. Edits and displays stored data in between parks. Searches for pre-defined song information that the user has inputted and when it identifies a match, downloads and plays a media data file using a media player on the current viewing computer.

Indicates on the current viewing screen if any of the parked-on hyperlinks cannot be linked to and/or displayed.

Rates the hyperlinked page that the cursor is parked on without leaving the current viewing page.

Every web site usually has a main web page that has at least one hyperlink to its inner page or other Uniform Resource Locators (URLs). Email texts often also contain hyperlinks. When one uses the Yahoo! search engine, for example, a number of URLs show up on the results page. When one reads a description of a URL and clicks on it, sometimes one finds that the page cannot be displayed, or the link is to a page one has already visited. Currently, when one clicks on a hyperlink and a new web page is displayed, from the Edit menu one can select Find (on This Page). When the Find dialog is displayed, one can input search string (s) into the textbox with the label Find What. One can click Find Next in the Find dialog to conduct a search on the newly displayed page. Then one clicks back to the previous web page to view other hyperlinks, clicks on those hyperlinks to display the web pages linked to by them, and then repeats the process of using Edit on the browser's menu bar. This process is tedious and error prone at best. This invention removes the forward and backward web page navigation from the user browsing experience and allows the user to devote more time and attention to searching for the information he/she really needs.

Currently, unlike this invention, none of the existing browser technologies, such as Microsoft Internet Explorer or Netscape, has the function of parking on the hyperlink, searching in the background, displaying the searched results, and storing the searched results without leaving the current viewing computer screen. This invention therefore can help cut down unwanted browsing time by showing the results of multiple-string searches on parked-on hyperlinks on the current viewing computer screen. The user can select and store a portion of each searched result. This invention provides a method of showing the strings matching percentage of the web page—it is named Web Page Text Rating Index (WPTRI). This index gives an objective rating of a specific web page based on predefined criteria provided by the user.

For example, when one parks the cursor on a particular text hyperlink or a picture hyperlink, the browser status bar, title bar, or tool-tip-text will display: "This page cannot be displayed -->http://www.cannotdisplay.com" if the page cannot be displayed. If the search strings were "dog" and "cat," the display may read: "{dog} has -->3, {cat} has --> 0, -->http://www.pethouse.com." Or the display may read: "Free dog examination, How to give your dog a bath, $50 for a mixed-breed dog -->http://www.pethouse.com." In the case of WPTRI, when browsing a web page, the status bar, title bar, or tool-tip-text will display a rating result such as: "This page is travel-related; its rating index is 35%." Thirty-five percent is the strings matching percentage. "Travel-related" is determined by matching the strings from different subject areas such as travel, law, medicine, etc. In this case, the most strings matched were travel-related. When the subject of travel is detected, it uses its sub-subjects to calculate the strings matching percentage. The higher the percentage, the better the travel content. The strings contained in the sub-subjects of "travel" for instance, can be requested from travel associations. The user may add to or modify the sub-subjects if he or she chooses to do so.

For example, in the Microsoft Explorer status bar, it will display: "This page is travel-related, its rating index is 35%," "Thailand has 5 out of 10 matches, Europe has 12 out of 20 matches, Japan has 6 out of 7 matches," etc. "Thailand has 5 out of matches" means that this web page contains five of the ten points of interest agreed on by the local travel association that provides the sub-subjects. This reduces the possibility of visiting web pages with exaggerated advertising or pages with much form but little substance. WPTRI is indifferent to web page layout, the color scheme of the web page, grammar, and other stylistic aspects of the web pages. It provides neutrality to the commercially-tilted search results (so-called "sponsored matches") seen on most search engines today.

The rating of a page can be achieved visually or for instance by U.S. Pat. No. 5,996,011, entitled "System and method for filtering data received by a computer system," issued on Nov. 30, 1999 to Donald Creig Humes, which filters objectionable words at the moment the computer receives the data. Another example is Platform for Internet Content Selection (PICS). The way PICS works is when the user requests to browse a URL, the filter software sends that URL to a label bureau requesting a description label of that URL, and that software will then decide based on the label received whether or not to reject connection to the URL. U.S. Pat. No. 6,266,664, entitled "Method for scanning, analyzing and rating digital information content," issued on Jul. 24, 2001 to Adrian Peter Russell-Falla and Andrew Bard Hanson weighs each filtered word on a web page and disallows connection to the URL if the words exceed a total threshold rating. U.S. Pat. No. 6,389,472, entitled "Method and system for identifying and locating inappropriate content" issued on May 14, 2002 to Patrick Alan Hughes and Paul Blair Elswick uses the strings in the proxy server to search the received data and disallows connection to the URL when the data is unwanted.

Chen's invention uses a Web Page Text Rating Index (WPTRI). The WPTRI is calculated by using rating subjects and sub-subjects from a predefined list to search web pages and then dividing the number of matches by the total number of strings in the sub-subjects and multiplying that number by 100. Rating methods vary.

The embodiment of Chen's invention uses, for example, the following Microsoft web products and technologies: Microsoft Office XP software including Excel VBA, Access VBA, Microsoft Internet Explorer, Access database, and Excel database; Microsoft SQL database software; Visual Basic 6.0; Visual Basic.Net; Microsoft Visual C++; C# programming language; Microsoft Windows Application Programming Interface; Microsoft Advance Server 2000; Windows CE; and Microsoft Visual Studio.Net. Other examples include Linux operation software, UNIX and PHP programming language, MySQL database, and Oracle database software. In Chen's invention, the client-side user computer can be a personal computer, a web pad, a tablet PC, a mobile PC, a PDA, a mobile phone with PDA, a Microsoft Smart Display, or an interactive digital TV. The computer link to the Internet can be wired or wireless. The input device used to input search strings in this invention can be a keyboard, a handwriting input device or a voice recognition device.

SUMMARY OF INVENTION (A) When the cursor parks on a hyperlink, tries to access the link and decides whether the link is accessible (B) When the cursor parks on a hyperlink, the computer automatically imports the web page associated with the hyperlink if the hyperlink is viewable and displayable, searches the hnk imported web page for matches with strings or other criteria the user has inputted and displays the results on the current viewing computer web page, whether or not there are matches. The search criteria can be added/deleted/modified in between parks. In between parks are for example when the browser navigating URL is changed, interrupted by at least one keyboard input or at least one mouse button click. Download a media data file to play a song on the current viewing computer using a media player (for example a Windows media player) when a search on the imported web page with the user's pre-defined search criteria has identified a match of the song's information. In a web page containing radio station hyperlinks, sequentially and automatically park the cursor on every hyperlink to search according to the user's pre-inputted priority song list and play the song on the media player when a match is found.

(C) Cut down unwanted browsing time by eliminating the need to search back-and-forth between hyperlinks by displaying the contexts that contain the searched strings on the current viewing computer screen. This assists the viewer in deciding whether or not to click on the hyperlink.

(D) All displayed data is stored in the computer. HPS can edit and display the stored data in between parks. HPS prints a summary of the search results from all parked-on hyperlinks. This allows the contents searcher in editing the searched context for example using Microsoft Word without leaving the current viewing computer page.

(E) Rates the page that the cursor is parked on without leaving the current viewing page.

DETAILED DESCRIPTION

Figure 1:
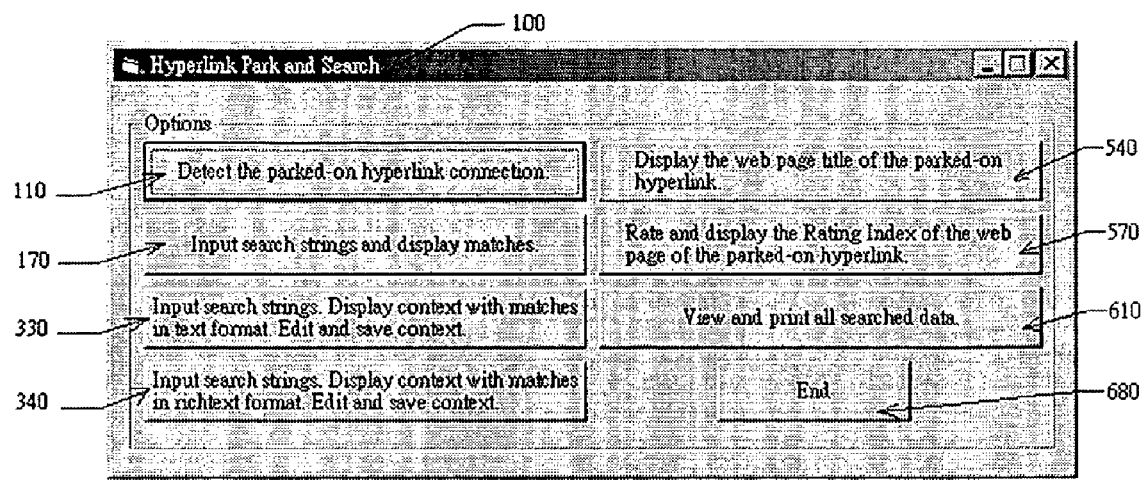
FIGS. 1 through 17 comprise the flowchart for a preferred embodiment of Hyperlink Park and Search.
Figure 2:
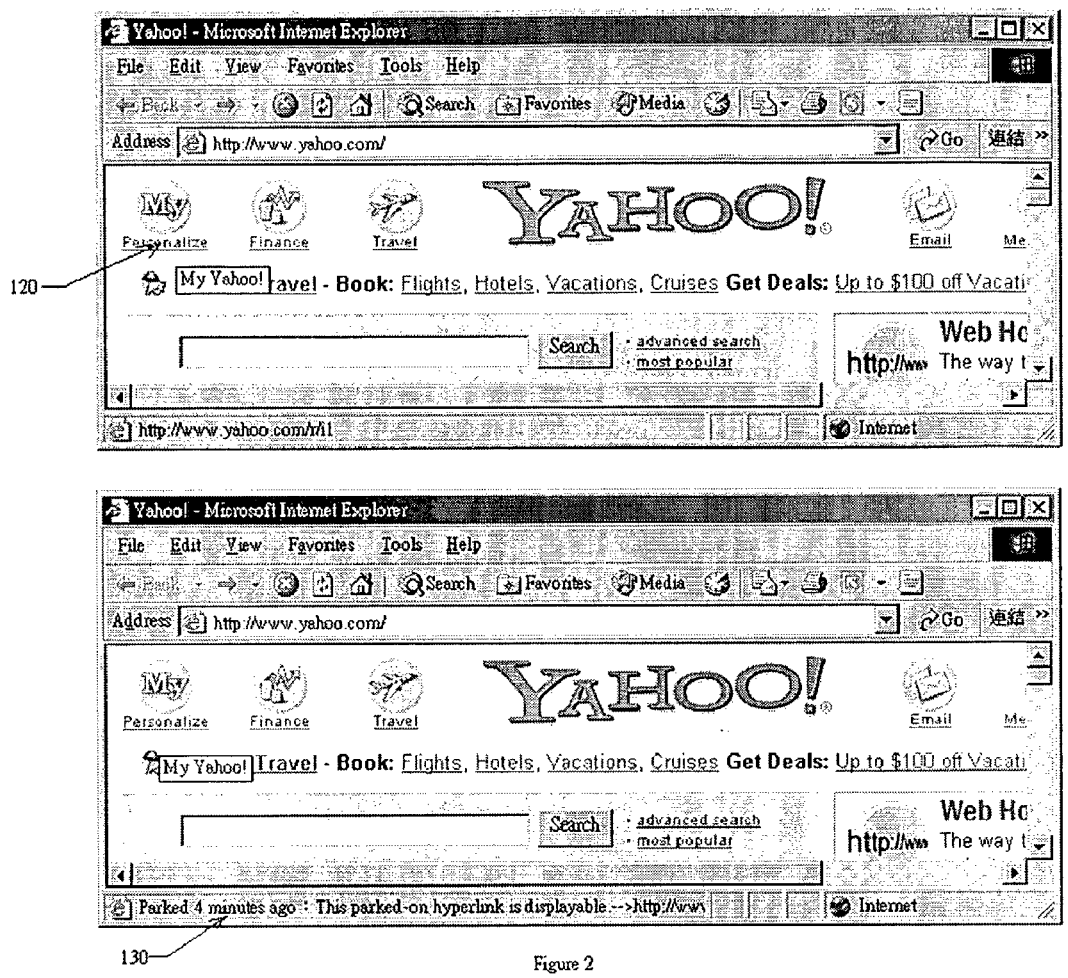

The preferred embodiment of the invention uses an open network, such as the Internet. A computer program by the name Hyperlink Park and Search for executing the preferred embodiment of this invention is already installed in the Windows XP program of a computer. Initiate the Windows XP program and click Start. Point to Programs, and a list of programs is displayed. Click on Hyperlink Park and Search, and a form 100 with the caption "Hyperlink Park and Search" is then opened as shown in FIG. 1. In the form 100, click the "Detect the parked-on hyperlink connection" button 11 0 and the browser is then opened with its default URL http://www.yahoo.com as shown in FIG. 2. The browser is made to a smaller Windows size in FIG. 2 merely for illustration purposes. While one is still viewing the web page content, park the cursor on the interested hyperlink "Personalize" 120 of the current viewing computer screen, obtaining the parked-on URL http://www.yahoo.co/r/il. The computer establishes an Internet connection with the parked-on URL behind the scene, imports the web page associated with the URL if the hyperlink is linkable and displayable, and then displays on the front screen if the parked-on hyperlink is linkable and/or displayable. In this example, the parked-on hyperlink is linkable and/or displayable; the browser status bar displays 130 "Parked 4 minutes ago: This parked-on hyperlink is displayable.-->http://www./yahoo.com/r/il."It means the viewer has parked on the hyperlink and conducted a search 4 minutes ago. Park the cursor on any other hyperlink on the same current viewing computer screen in FIG. 2. The browser status bar will display whether the parked-on hyperlink is linkable and/or displayable, and if the link is to a page one has already visited or not.

Figure 3:
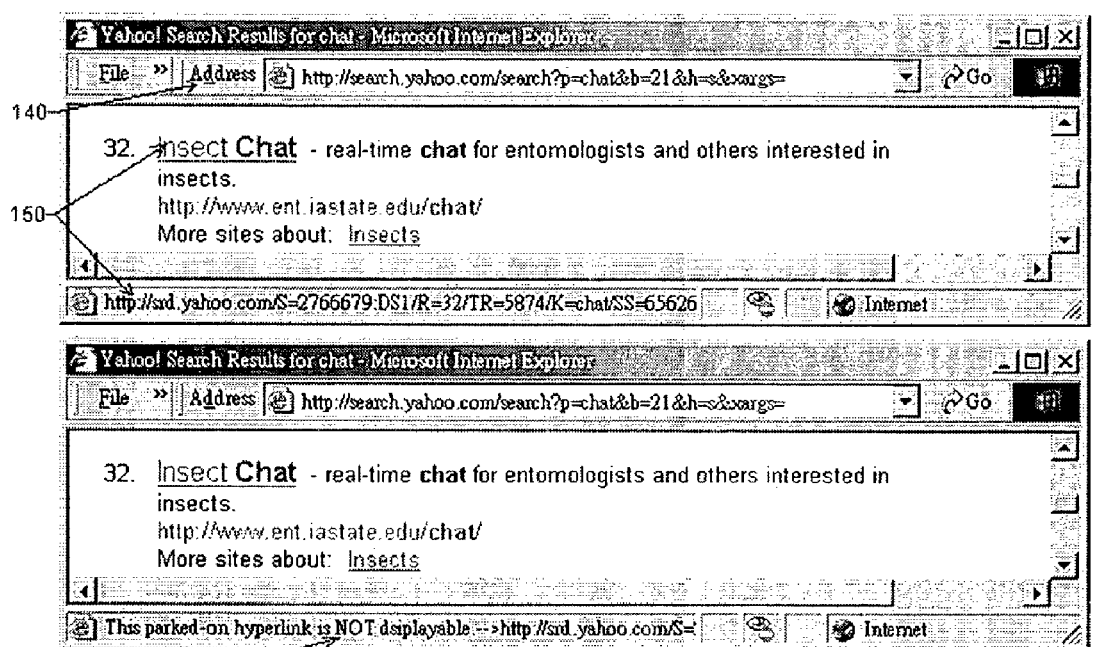

When the address of the browser is changed to a different URL 140 such as http://search.yahoo.com/search?p=chat&b=21&h=s&xargs=as shown in FIG. 3, and the user parks the cursor on the hyperlink 150 http://www.ent.iastate.edu/chat/on the current viewing computer screen, the computer obtains and establishes an Internet connection with the parked-on URL behind the scene. In this example, the browser status bar displays 160 "This parked-on hyperlink is NOT displayable. -->http://www.ent.iastate.edu/chat/." If the user clicks on the Close button at the top right corner of the browser, the HPS program terminates. Instead of terminating the HPS program, park the cursor on any hyperlink on the current viewing computer screen and then press a key on the keyboard; in the embodiment of the invention press the F12 key on the keyboard. This prompts a message box and the message: "Back to Hyperlink Park and Search?" is displayed. Click Yes, the browser is then closed and the form 100 with the caption "Hyperlink Park and Search" as in FIG. 1 is shown again.

Figure 4:
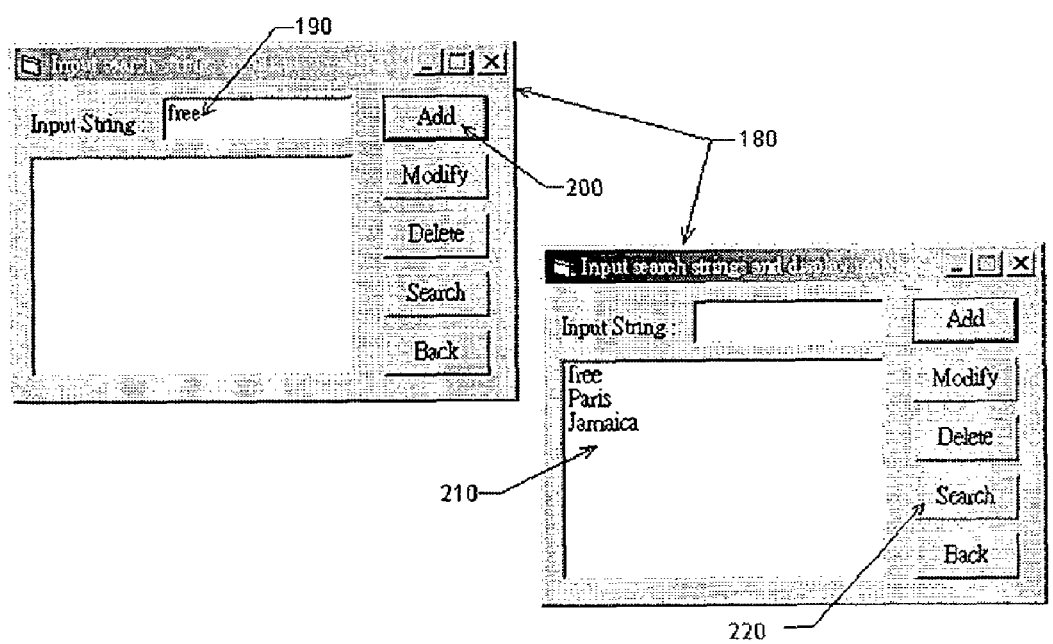
Figure 5:
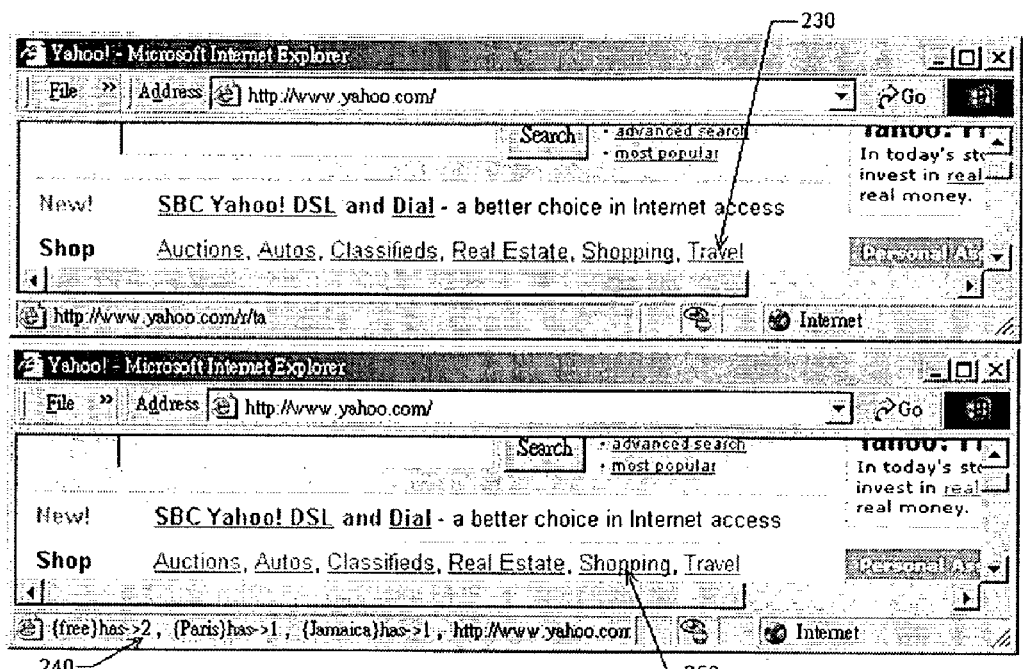
Figure 6:
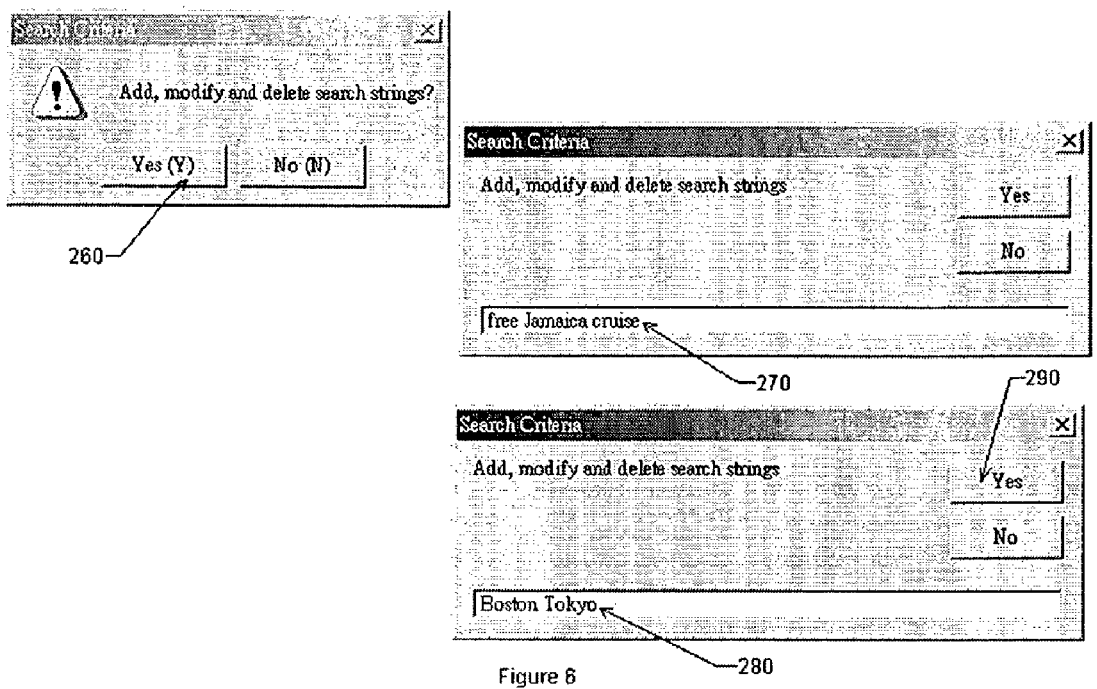
Figure 7:
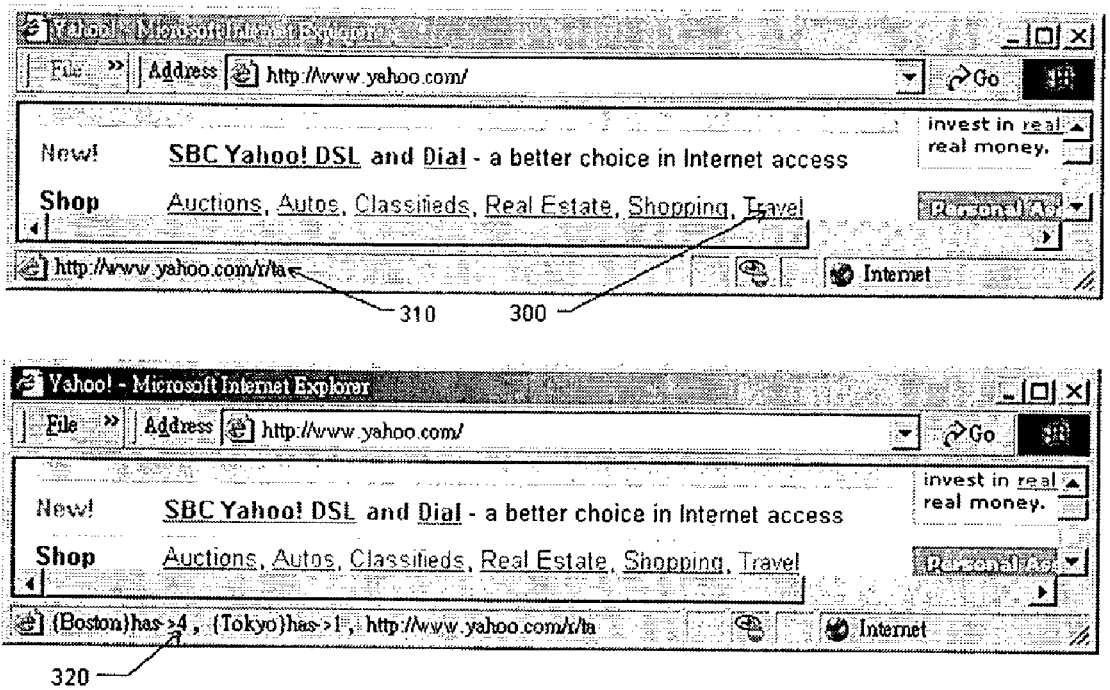

In FIG. 1, click on the "Input search strings and display matches" button 170, and a form 180 with the caption "Input search strings and display matches" is shown as in FIG. 4. At the input box input "free" 190, click Add 200, input "Paris" into the input box, and click Add 200 again. Input "Jamaica" into the input box and click Add 200. There are now three strings 210 in the box. And then click Search 220 to start the browser with its default URL http://www.yahoo.com as shown in FIG. 5. In FIG. 5, park the cursor on the hyperlink 230 having the text "Travel". The status bar of the same browser displays: "{free} has -->2, {Paris} has -->1; {Jamaica} has -->1, http://www.yahoo.com/r/ta." It means if one clicks on the hyperlink 230, the browser will display the linking web page containing one match of "free", two matches of "Paris" and one match of "Jamaica". Then park the cursor on a hyperlink on the current viewing computer screen. In this example, park on the hyperlink having the text "Shopping" 250 and press the F9 key on the keyboard. This prompts the Search Criteria dialog and the message "Add, modify and delete search strings?" is displayed as shown in FIG. 6. In FIG. 6, click Yes(Y) 260, and change 270 the three strings, "free", "Jamaica" and "cruise" in the input box to become two strings, "Boston" and "Tokyo" 280, and then click Yes 290. The computer screen displays the browser as shown in FIG. 7. Park the cursor on the hyperlink having the text "Travel" 300. The browser's status bar displays the URL of the hyperlink automatically 310. The browser then displays: "{Boston} has -->4, {Tokyo} has -->1, http://www.yahoo.com/r/ta." It means if one clicks on the hyperlink 300, the browser will display the linking web page containing four matches of "Boston" and one match of "Tokyo".

Figure 8:
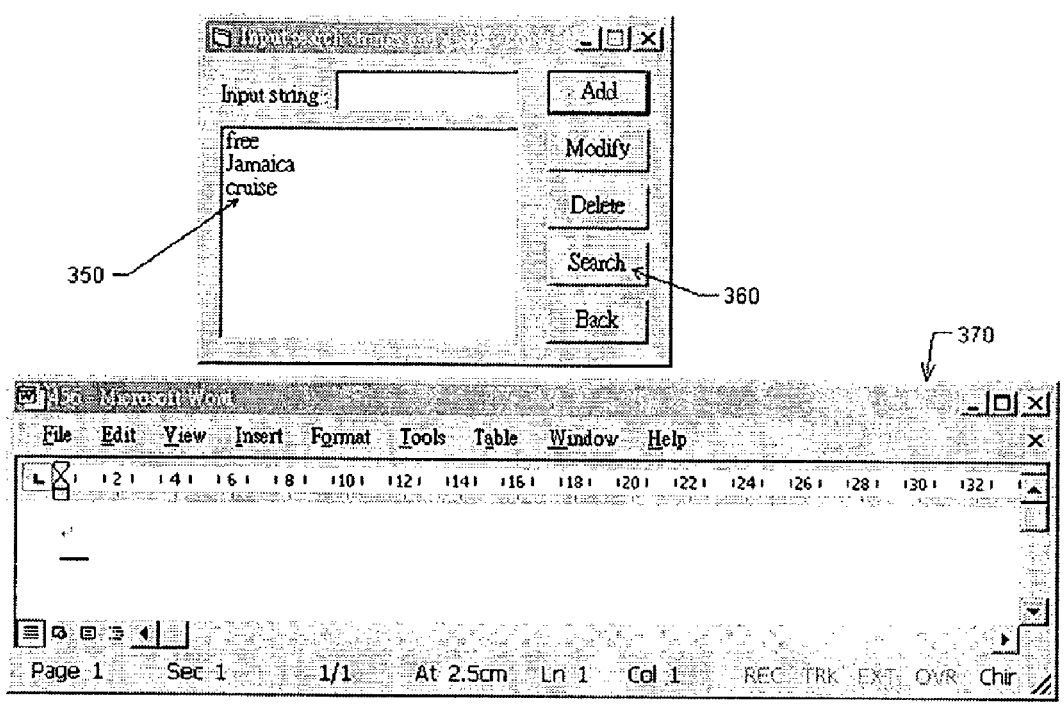
Figure 9:
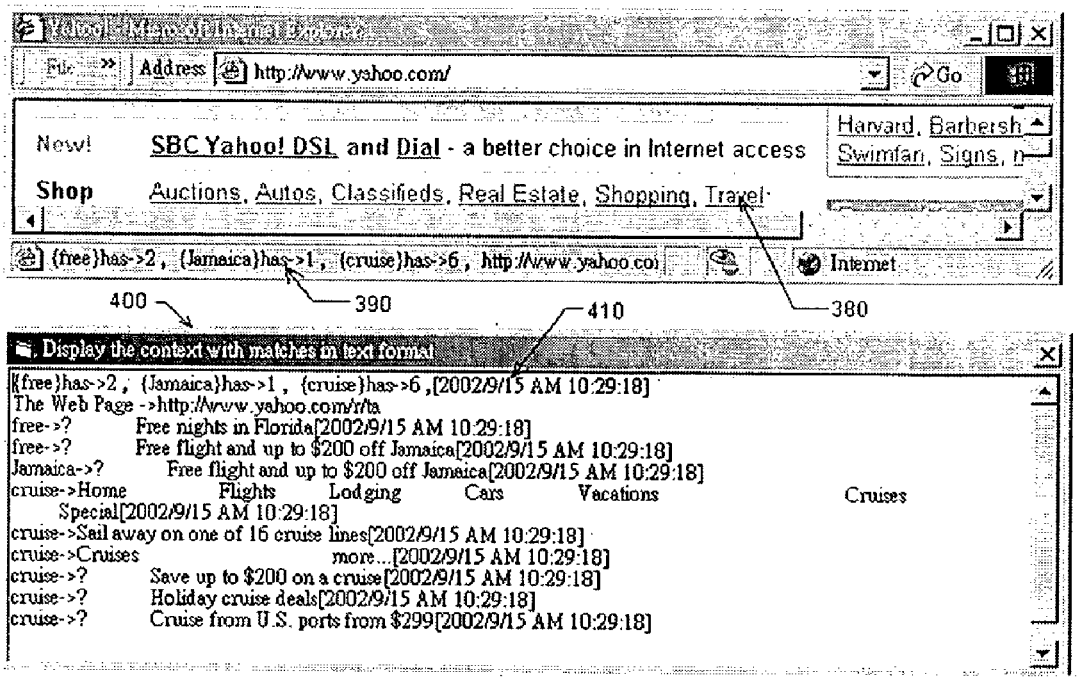

At this stage, press the F12 key on the keyboard. This prompts a dialog displaying the message "Back to Hyperlink Park and Search?" Click Yes, and the browser is then closed and the form 100 with the caption "Hyperlink Park and Search" in FIG. 1 is shown again. In FIG. 1, the difference between "Input search strings. Display context with matches in text format. Edit and Save displayed context." 330 and "Input search strings. Display context with matches in rich-text format. Edit and Save displayed context." is that one is displaying in text format and the other is displaying in rich-text format. The steps to describe button 330 is identical to button 340. Therefore, at here the steps to describe button 330 is illustrated. In FIG. 1, click on "Input search strings. Display context with matches in text format. Edit and save context." 330. A form 280 with the caption "Input search strings and display context with matches in text format" is shown as in FIG. 8. In FIG. 8, at the input box input "free", click Add, input "Jamaica", and click Add again. Input "cruise" into the input box and click Add. There are now three strings 350 in the box. Click Search 360 to start the browser with its default URL http://www, yahoo.com as shown in FIG. 9 and to invoke the Microsoft Word program 370 as shown in FIG. 8. In FIG. 9, park the cursor on the hyperlink 380 having the text "Travel". The status bar of the same browser displays "{free} has -->2, {Jamaica} has -->1; {cruise} has -->1-->http://www.yahoo.com/r/ta." It means if one clicks on the hyperlink 380, the browser will display the linking web page containing two matches of "free", one match of "Jamaica" and one match of "cruise". The form 400 with the caption "Display the context with matches in text format" is then displayed on the current viewing computer screen as shown in FIG. 9. The time data 410 "[2002/9/15 AM 10:29:18]" in FIG. 9 is not a portion of the searched match. The time data is attached to each search match for the Hyperlink Park and Search user to keep a time track of his search.

Figure 10:
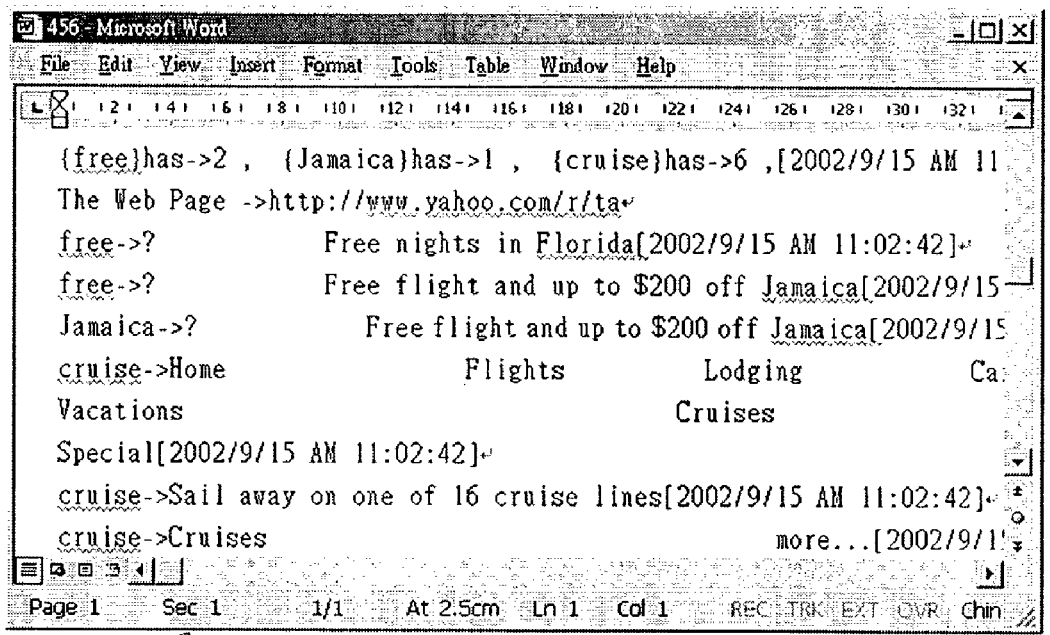
Figure 11:
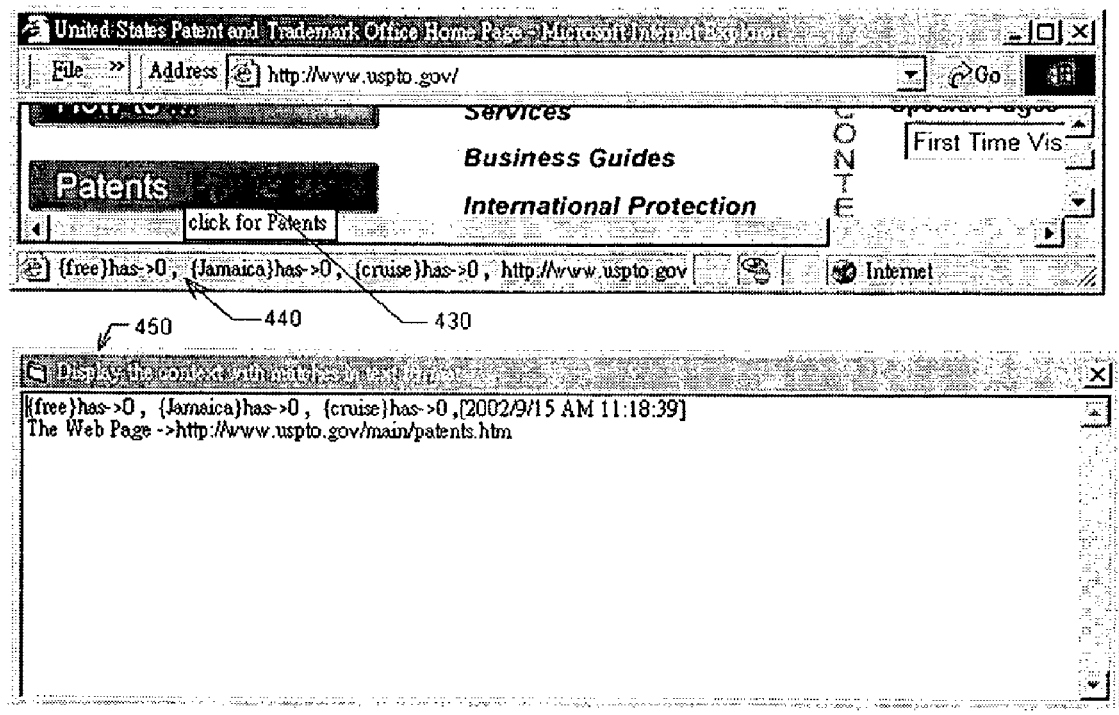
Figure 12:
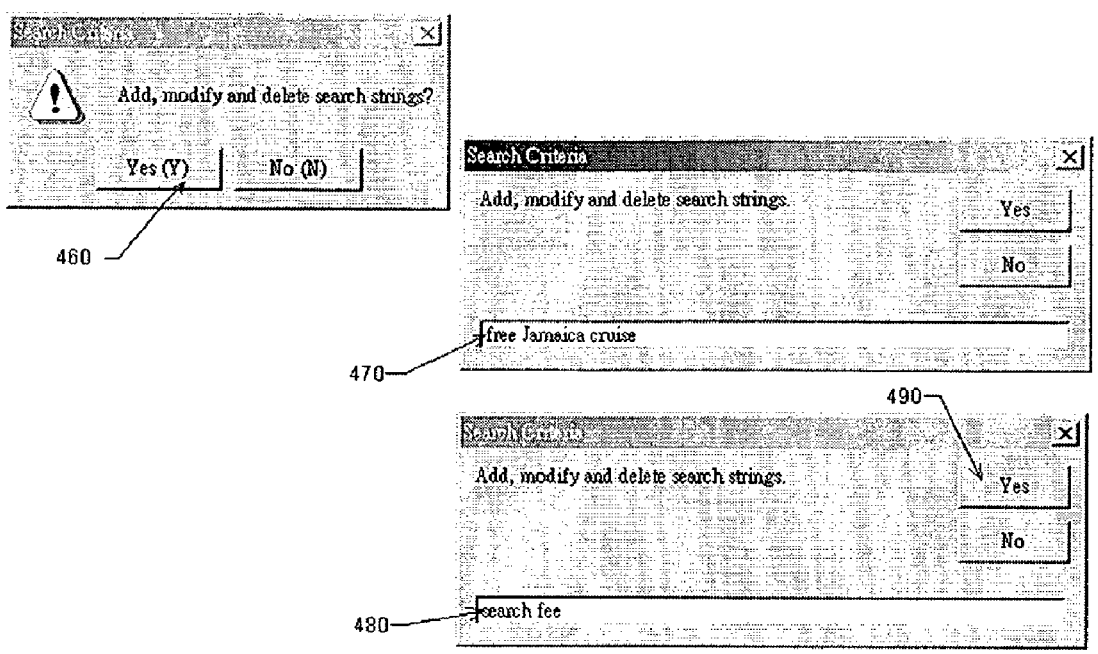
Figure 13:
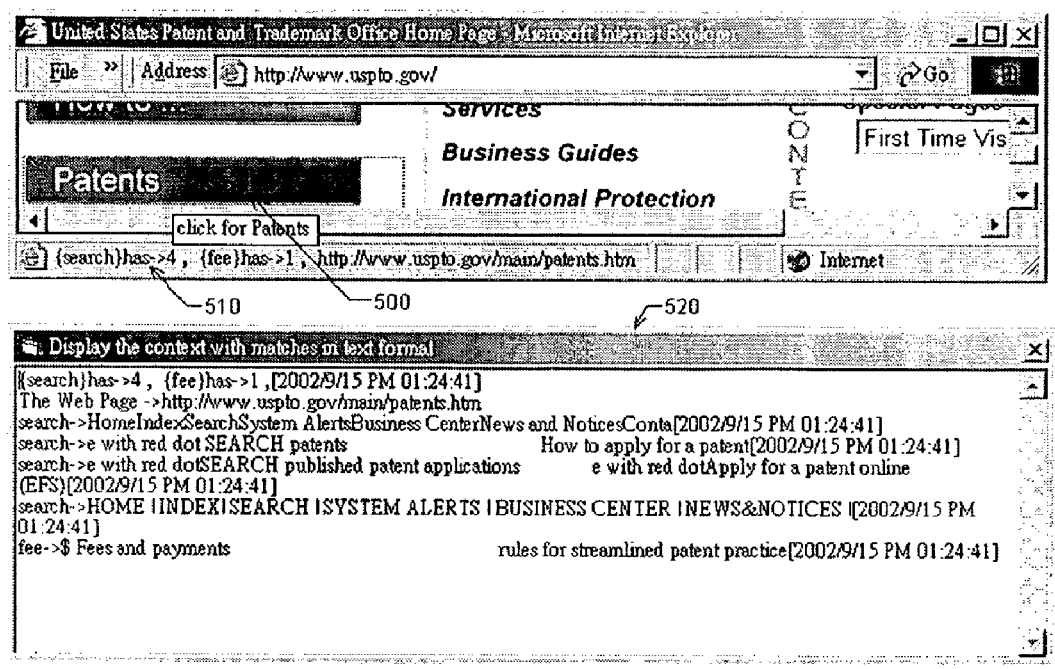

At this stage, park the cursor on a hyperlink on the current viewing computer screen. In this example, park on the hyperlink having the text "Travel" 380 and press the F10 key on the keyboard simultaneously. This sends all the data displayed in the form 400 with the caption "Display the context with matches in text format" in FIG. 9 into 420 the Microsoft Word file named 456.doc as shown in FIG. 10. Change the address of the same browser to http://www.uspto.gov/ as shown in FIG. 11. Park the cursor on the text hyperlink "Patents" 430. The browser's status bar displays: 440 "{free} has -->0, {Jamaica} has -->0, {cruise} has -->0, http://www.uspto.gov/main/patents.htm". The searched result is displayed in the form with the caption "Display the context with matches in text format" 450. Park on the hyperlink having the text "Patents" 430 and press the F9 key on the keyboard. This prompts the Search Criteria dialog containing the message "Add, modify and delete search strings?" to be displayed as shown in FIG. 12. In FIG. 12, click Yes(Y) 460, and change 470 three strings, "free", "Jamaica" and "cruise", in the input box to two strings, "search" and "fee" 480, and then click Yes 490. The computer screen displays the browser as shown in FIG. 13. In FIG. 13, park the cursor on the hyperlink having the text "Patents" 500. The browser then displays: 510 "{search} has -->4, {fee} has -->1, http://www.uspto.gov/main/patents.htm." The search result is displayed in the form with the caption "Display the context with matches in text format" 520.

Figure 14:
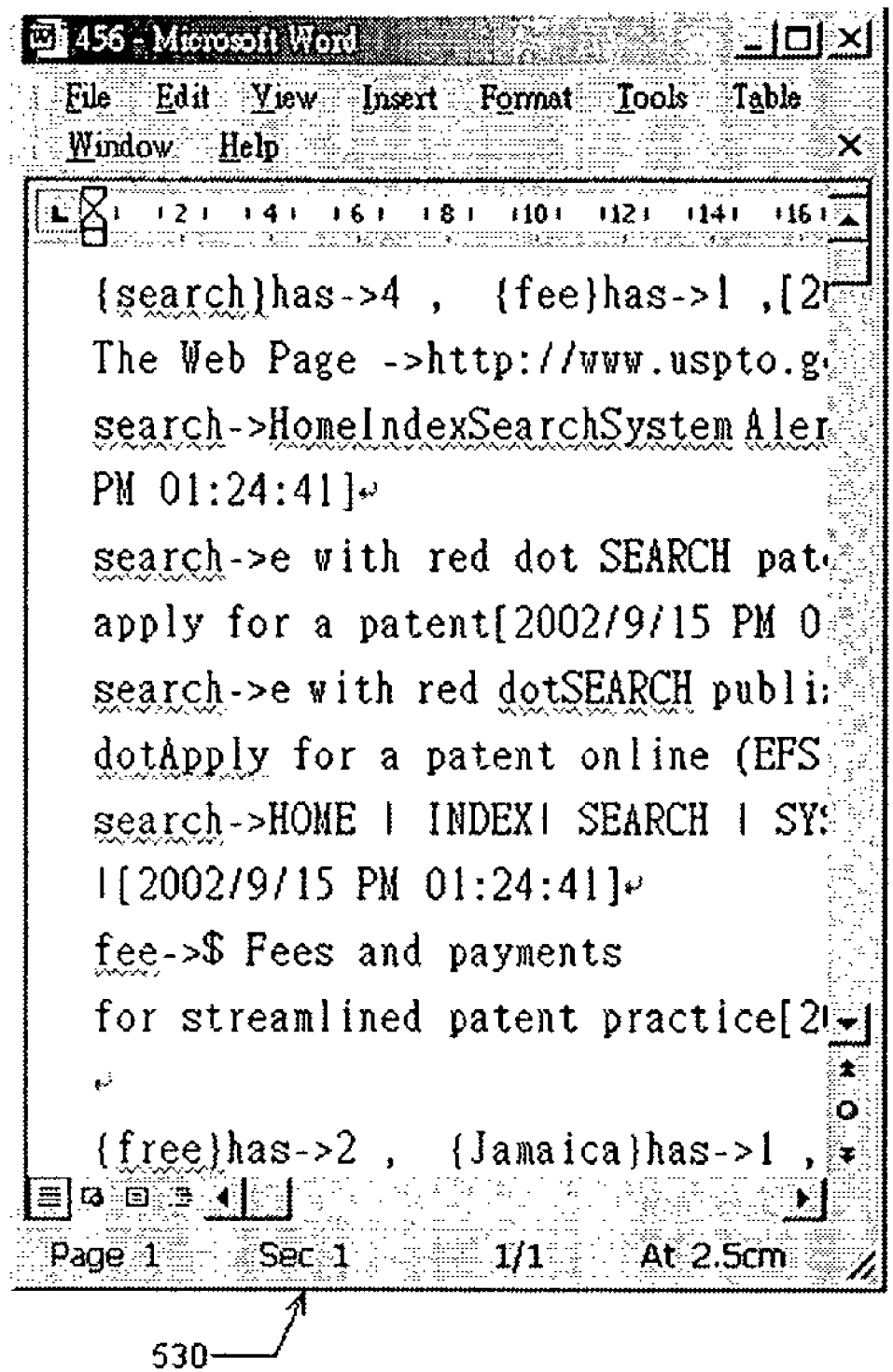
Figure 15:
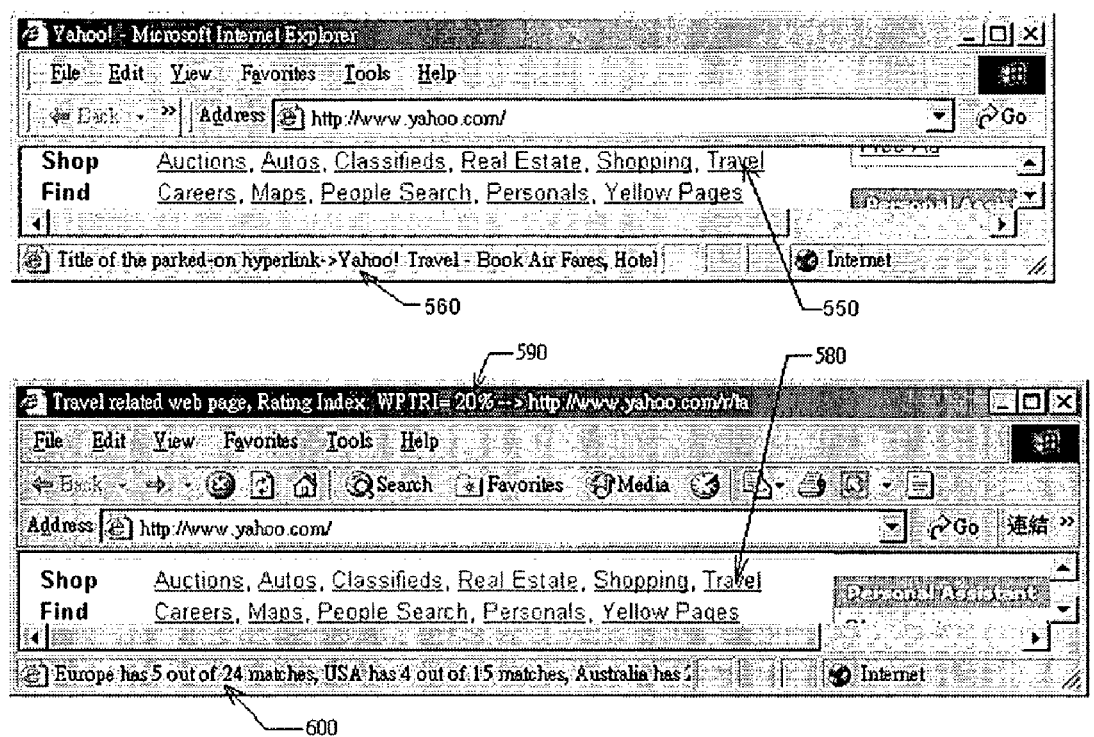

At this stage, park the cursor on a hyperlink on the current viewing computer screen. In this example, park on the hyperlink having the text "Patents" 500 and press the F10 key on the keyboard simultaneously. This sends all the data displayed in the form 520 with the caption "Display the context with matches in text format" in FIG. 13 into the first line 530 of the Microsoft Word file named 456.doc as shown in FIG. 14. At this stage, press the F12 key on the keyboard. This prompts a message box and the message "Back to Hyperlink Park and Search?" is displayed. Click Yes, and the browser is then closed and the form 100 with the caption "Hyperlink Park and Search" as in FIG. 1 is shown again. In FIG. 1, click "Display the web page title of the parked-on hyperlink" 540 to start the browser with its default URL http://www.yahoo.com as shown in FIG. 15. Park the cursor on the hyperlink with the text "Travel" 550. The browser's status bar displays: "Title of the parked-on hyperlink -->Yahoo Travel-Book Air Fares, Hotel" 560. When any of the hyperlinks in the current viewing computer screen is parked on, the browser status bar will display the web page title of the parked-on hyperlink. At this stage, press the F12 key on the keyboard. This prompts a message box and the message "Back to Hyperlink Park and Search?" is displayed. Click Yes, and the browser is then closed and the form 100 with the caption "Hyperlink Park and Search" as in FIG. 1 is shown again. In FIG. 1, click "Rate and display Rating Index of the web page of the parked-on hyperlink" 570 to start the browser with its default URL http://www.yahoo.com as shown in FIG. 15. Park the cursor on the hyperlink with the text "Travel" 580. The browser title bar displays: "Travel related web page, Rating Index WPTRI=20% -->http://www.yahoo.com//r/ta." 590. It means the web page rating of the parked-on hyperlink is 20%. The higher the percentage the better the web page travel content. At the same time, the browser status bar displays: "Europe has 5 out of 24 matches, USA has 3 out of 15 matches, Australia has 2 out of 6 matches, Japan has . . . " 600. This means the web page of the parked-on hyperlink contains 5 matches out of 24 European travel points of interest, 3 matches out of 15 USA travel points of interest and 2 matches out of 6 Australian travel points of interest 600.

Figure 16:
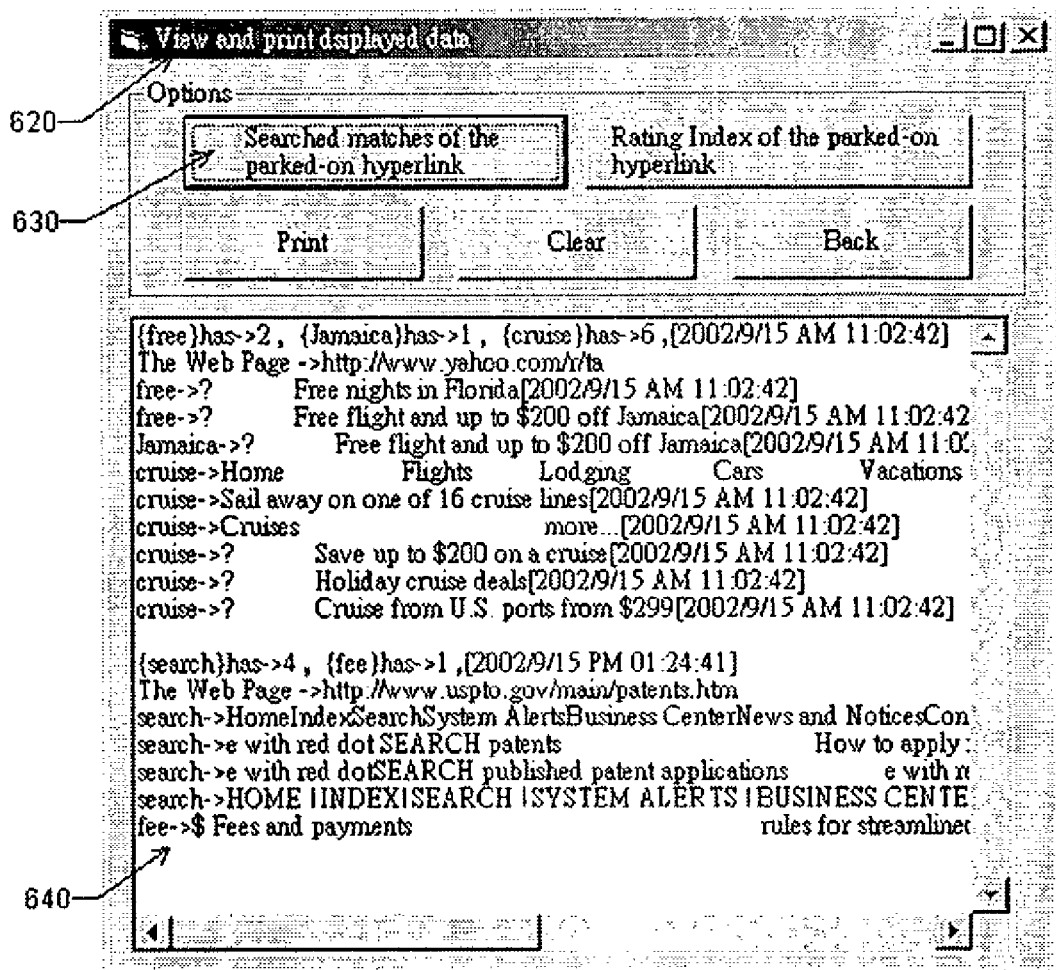
Figure 17:
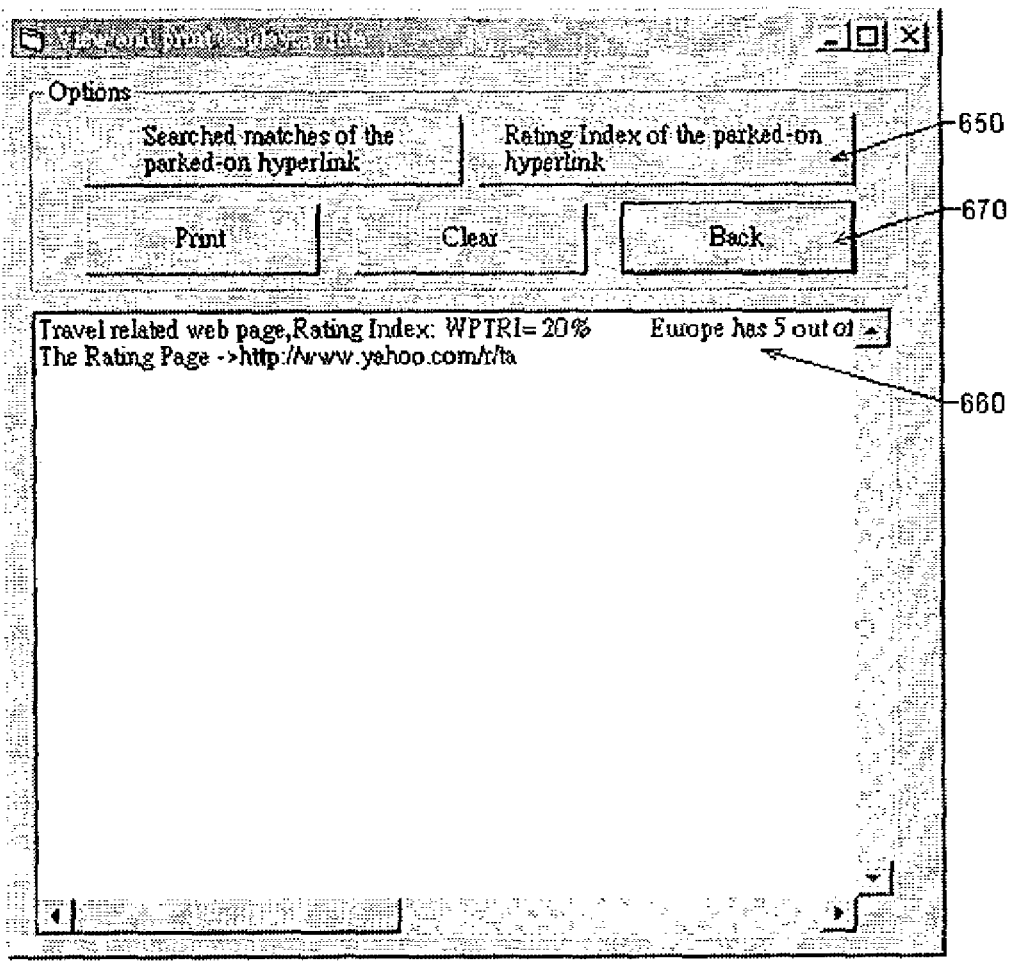

At this stage, press the F12 key on the keyboard. This prompts a message box and the message "Back to Hyperlink Park and Search?" is displayed. Click Yes, and the browser is then closed and the form 100 with the caption "Hyperlink Park and Search" as in FIG. 1 is shown again. In FIG. 1, click on "View and print all search data." 610, and a form 620 with the caption "View and print displayed data" is shown as in FIG. 16. In FIG. 16, click on the "Searched matches of the parked-on hyperlink" 630 button. The search-match record of the parked-on hyperlinks is displayed 640 as shown in FIG. 16. Click on the "Rating index of the parked-on hyperlink" button 650, and the Rating Index of the parked-on hyperlinks is displayed 660 as shown in FIG. 17. Clicking button 670 in FIG. 17 takes the user back to the form 100 with the caption "Hyperlink Park and Search" as shown in FIG. 1. To terminate the usage of Hyperlink and Park, click End 680.

The invetion claimed is:

1. A method for hyperlink parking and background searching, comprising:
adding, deleting, or modifying a search criteria, including at least one search term, to form a user pre-defined search criteria;
obtaining a universal resource locator (URL) by parking a cursor on a hyperlink displayed on the current viewing computer screen;
in response to parking the cursor on the hyperlink, establishing an Internet connection with the URL; and
if the parked-on hyperlink is linkable and displayable:
displaying a second indication on the current viewing computer screen,
importing a web page associated with the URL, searching the imported web page with the user predefined search criteria to determine a number of matches for each search term, and displaying each search term and a number of matches for each search term on the current viewing computer screen otherwise:

displaying a first indication on the current viewing computer screen.

2. The method of claim 1, wherein the first indication, the second indication, the search terms and the number of matches are displayed in a web browser.

3. The method of claim 1, further comprising displaying the contexts that contains the search terms on the current viewing computer screen.

4. The method of claim 1, further comprising:

rating the imported web page content with a search-rate criteria; and displaying a Web Page Text Rating Index (WPTRI) on the current viewing computer screen as a result from the search-rate criteria.

5. The method of claim 4, wherein said rating includes:

determining a selected subject by selecting at least a rating subject and/or sub-subject from a predefined list;

determining a search subject by searching the imported web page with all the rating subjects in the predefined list if there is no selection of a selected subject, and searching the web page with the sub-subjects of the rating subject with the most matches or if there is an equal number of rating subjects with the most matches, then searching the web page with the sub-subjects of the rating subject that matches first on the web page; and using the selected subjects sub-subjects if there is a selected subject, if not, using the searched subject's sub-subjects to calculate the WPTRI by dividing the number of matches by the total number of strings in the sub-subjects and multiplying that number by 100.

6. The method of claim 1, further comprising:

storing at least a portion of each displayed data into a memory located in the current viewing computer, and editing, displaying and printing the stored data from the memory.

7. The method of claim 6, further comprising:

using the obtained URL as a search string to search the stored data in the memory located in the current viewing computer, and displaying the match on the current viewing computer screen.

8. The method of claim 1 wherein the user pre-defined search criteria may be added, deleted, or modified between a first park and a second park.

9. The method of claim 8, wherein between the first park and the second park, at least one keyboard input or at least one mouse button click is received.

10. The method of claim 8 wherein, between the first park and the second park, the URL hosting the hyperlink is changed.

11. The method of claim 1 further comprising downloading a media data file to play on the current viewing computer by a media player when a search of the imported web page with the user pre-defined search criteria has identified a match of the media data file's information.

12. A system adapted to implement a method for hyperlink parking with background searching, the method comprising:

adding, deleting, or modifying a search criteria, including at least one search term, to form a user pre-defined search criteria;

obtaining a universal resource locator (URL) by parking a cursor on a hyperlink displayed on the current viewing computer screen;

in response to parking the cursor on the hyperlink, establishing an Internet connection with the URL; and if the parked-on hyperlink is linkable and displayable:

displaying a second indication on the current viewing computer screen, importing a web page associated with the URL, searching the imported web page with the user predefined search criteria to determine the number of matches for each search term, and displaying each search term and a number of matches for each search term on the current viewing computer screen otherwise:

displaying a first indication on the current viewing computer screen.

13. The system of claim 12, wherein the first indication, the second indication, the search terms and the number of matches are displayed in a web browser.

14. The system of claim 12, wherein the method further comprises displaying the contexts that contain the search terms on the current viewing computer screen.

15. The system of claim 12, wherein the method further comprises:

rating the imported web page content with a search-rate criteria; and displaying a Web Page Text Rating Index (WPTRI) on the current viewing computer screen as a result from the search-rate criteria.

16. The system of claim 12, wherein the user pre-defined search criteria may be added, deleted, or modified between a first park and a second park.

17. The system of claim 16, wherein, between the first park and the second park, at least one keyboard input, or at least one mouse button click, is received.

18. The system of claim 16, wherein, between the first park and the second park, the URL hosting the hyperlink is changed.

19. A machine readable medium storing instructions adapted to be executed by at least one processor to implement a method for hyperlink parking with background searching, the method comprising:

adding, deleting, or modifying a search criteria, including at least one search term, to form a user pre-defined search criteria;

obtaining a universal resource locator (URL) by parking a cursor on a hyperlink displayed on the current viewing computer screen;

in response to parking the cursor on the hyperlink, establishing an Internet connection with the URL; and if the parked-on hyperlink is linkable and displayable:

displaying a second indication on the current viewing computer screen, importing a web page associated with the URL, searching the imported web page with the user predefined search criteria to determine a number of matches for each search term, and displaying each search term and a number of matches for each search term on the current viewing computer screen otherwise:
    displaying a first indication on the current viewing computer screen.

20. The machine readable medium of claim 19, wherein the first indication, the second indication, the search terms and the number of matches are displayed in a web browser.

21. The machine readable medium of claim 19, wherein the method further comprises displaying the contexts that contain the search terms on the current viewing computer screen.

22. The machine readable medium of claim 19, wherein the method further comprises:
    rating the imported web page content with a search-rate criteria; and
    displaying a Web Page Text Rating Index (WPTRI) on the current viewing computer screen as a result from the search-rate criteria.

23. The machine readable medium of claim 19, wherein the user pre-defined search criteria may be added, deleted, or modified between a first park and a second park.

24. The machine readable medium of claim 23, wherein, between the first park and the second park, at least one keyboard input, or at least one mouse button click, is received.

25. The machine readable medium of claim 23, wherein, between the first park and the second park, the URL hosting the hyperlink is changed.

* * * * *